United States Patent
Dahl et al.

(10) Patent No.: US 9,631,501 B2
(45) Date of Patent: Apr. 25, 2017

(54) WIND TURBINE BLADE COMPRISING METAL FILAMENTS AND CARBON FIBRES AND A METHOD OF MANUFACTURING THEREOF

(75) Inventors: Martin Dahl, Flensburg (DE); Bjarne Krab Mortensen, Billund (DK); Morten Olesen, Lunderskov (DK)

(73) Assignee: LM WIND POWER A/S, Kolding (DE)

( * ) Notice: Subject to any disclaimer, the term of this patent is extended or adjusted under 35 U.S.C. 154(b) by 587 days.

(21) Appl. No.: 14/130,535

(22) PCT Filed: Jul. 6, 2012

(86) PCT No.: PCT/EP2012/063209
§ 371 (c)(1),
(2), (4) Date: Jan. 2, 2014

(87) PCT Pub. No.: WO2013/004808
PCT Pub. Date: Jan. 10, 2013

(65) Prior Publication Data
US 2014/0119936 A1    May 1, 2014

(30) Foreign Application Priority Data

Jul. 6, 2011    (EP) ..................... 11172900

(51) Int. Cl.
*F03D 11/00*    (2006.01)
*F01D 5/28*    (2006.01)
(Continued)

(52) U.S. Cl.
CPC ............. *F01D 5/282* (2013.01); *B29C 70/021* (2013.01); *B29C 70/547* (2013.01); *B32B 27/08* (2013.01);
(Continued)

(58) Field of Classification Search
CPC ........... F03D 1/0675; F05B 2280/6003; F05D 2230/603; F05D 2230/6034;
(Continued)

(56) References Cited

U.S. PATENT DOCUMENTS 9,027,820 B2 * 5/2015 Heck ...................... B32B 15/14
228/112.1
2007/0251090 A1 * 11/2007 Breugel .................. B29C 70/30
29/889.7

FOREIGN PATENT DOCUMENTS

EP    1310351 A1    5/2003
EP    1990178 A1    11/2008
(Continued)

*Primary Examiner* — Ninh H Nguyen
(74) *Attorney, Agent, or Firm* — Nath, Goldberg & Meyer; Jerald L. Meyer; Tanya E. Harkins

(57) ABSTRACT

Wind turbine blade has a longitudinal direction and includes a shell structure made of a fiber-reinforced polymer material including a polymer matrix and reinforcement material comprising a plurality of carbon fiber layers embedded in the polymer matrix. At least a portion of the shell structure is formed of a laminate 6 comprising at least one metal filament layer 15, 18 comprising metal filaments and being sandwiched between two carbon fiber layers 16, 16; 17, 18 comprising carbon fibers only. The carbon fiber layers are arranged contiguously with the metal filament layer.

18 Claims, 3 Drawing Sheets

(51) Int. Cl.
*B29C 70/54* (2006.01)
*F03D 1/06* (2006.01)
*B29C 70/02* (2006.01)
*B32B 27/08* (2006.01)
*B29L 31/08* (2006.01)
*B32B 15/14* (2006.01)

(52) U.S. Cl.
CPC ...... *F03D 1/0675* (2013.01); *B29L 2031/082* (2013.01); *B32B 15/14* (2013.01); *B32B 2262/103* (2013.01); *B32B 2262/106* (2013.01); *B32B 2603/00* (2013.01); *F05B 2280/10* (2013.01); *F05B 2280/2006* (2013.01); *F05B 2280/6013* (2013.01); *Y02E 10/721* (2013.01); *Y02P 70/523* (2015.11)

(58) Field of Classification Search
CPC ........... F05D 2230/614; F05D 230/603; F05D 230/6034; F05D 230/614; Y02E 10/721; B32B 15/14; B32B 2262/103; B32B 2262/106; B32B 2603/00
See application file for complete search history.

(56) References Cited

FOREIGN PATENT DOCUMENTS

| | | |
|---|---|---|
| EP | 2153964 A1 | 2/2010 |
| WO | 2010018225 A2 | 2/2010 |

\* cited by examiner

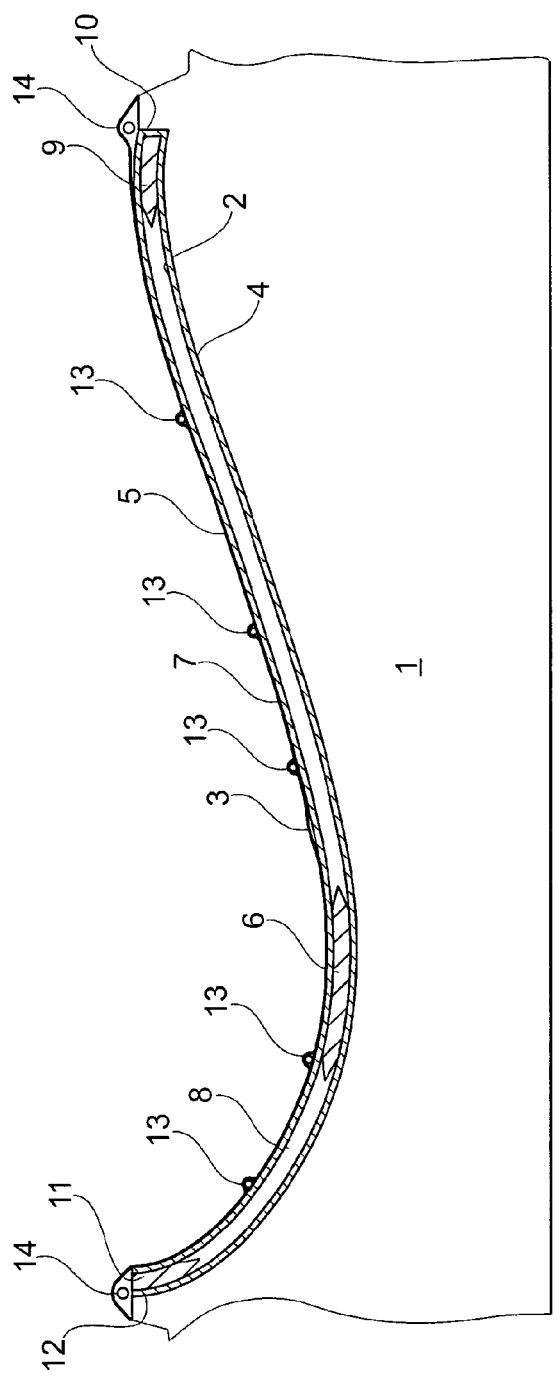
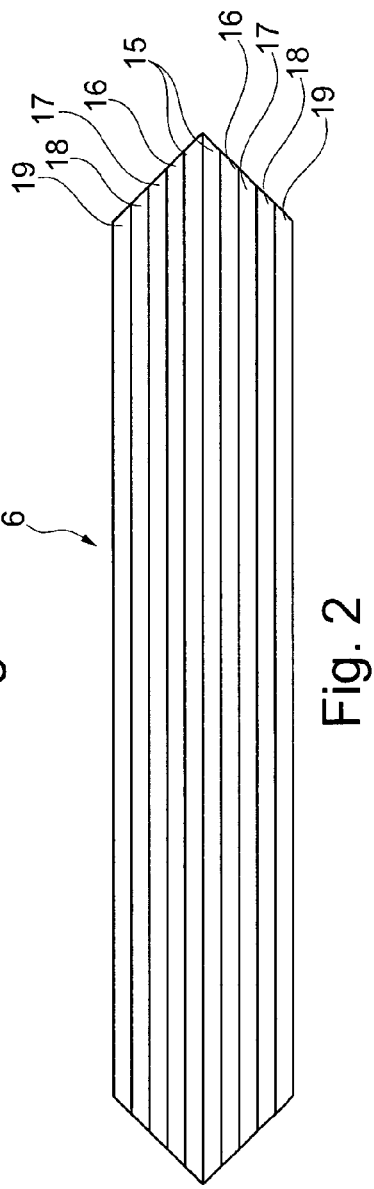
Fig. 1
Fig. 2

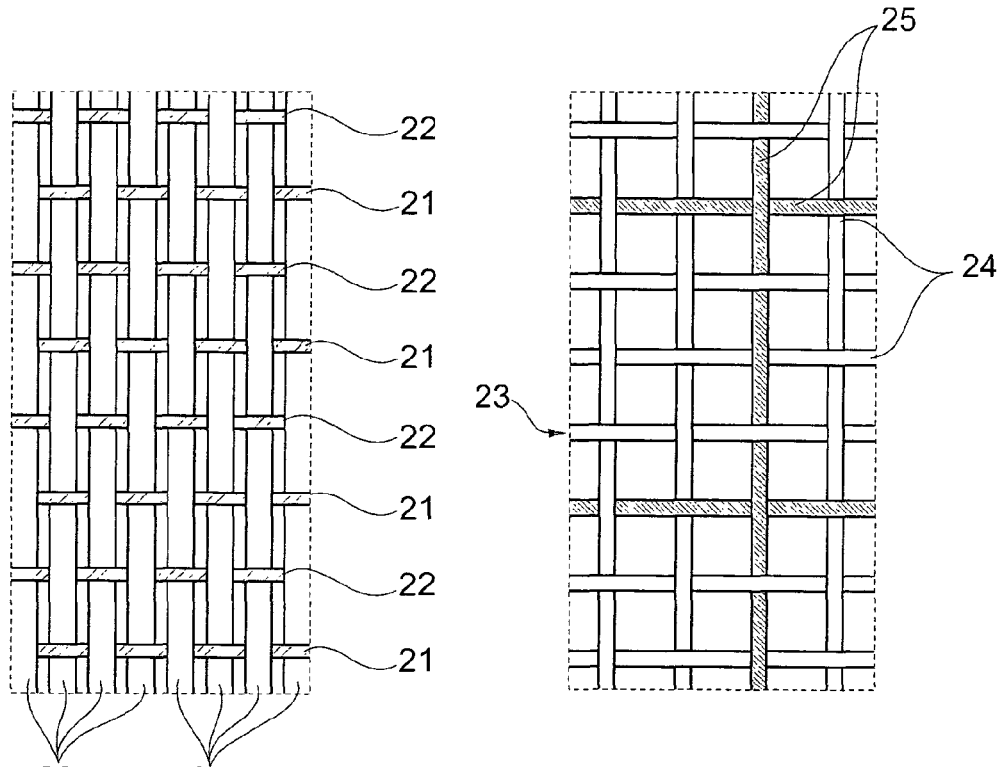
Fig. 3
Fig. 4
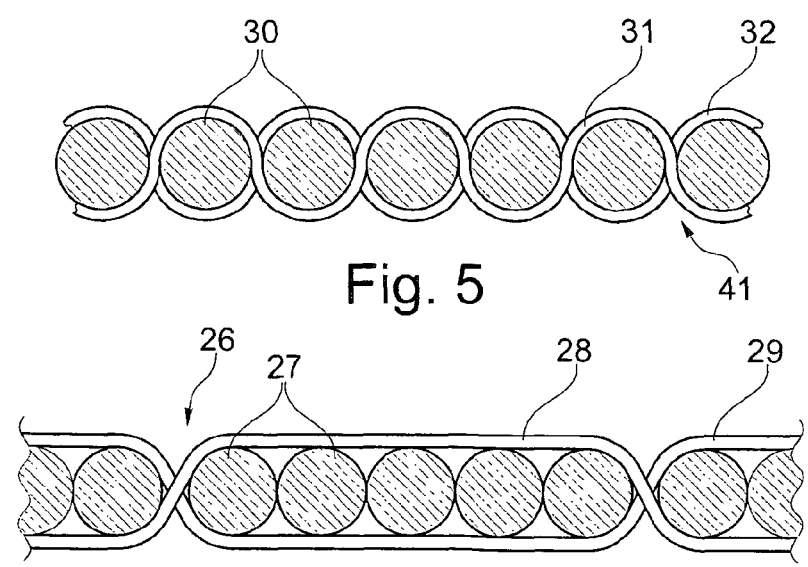
Fig. 5
Fig. 6

WIND TURBINE BLADE COMPRISING METAL FILAMENTS AND CARBON FIBRES AND A METHOD OF MANUFACTURING THEREOF

This is a National Phase Application filed under 35 U.S.C. 371 as a national stage of PCT/EP2012/063209, filed Jul. 6, 2012, and claims priority benefit from European Application No. 11172900.0, filed Jul. 6, 2011, the content of each of which is hereby incorporated by reference in its entirety.

TECHNICAL FIELD

The present invention relates to a wind turbine blade having a longitudinal direction and including a shell structure made of a fibre-reinforced polymer material including a polymer matrix and reinforcement material comprising a plurality of carbon fibre layers embedded in the polymer matrix.

The invention further relates to a method of manufacturing a shell structure part of a wind turbine blade, the shell structure part being made of a fibre-reinforced polymer material including a polymer matrix and a fibre-reinforcement material comprising a plurality of carbon fibre layers embedded in the polymer matrix.

BACKGROUND ART

Vacuum infusion or VARTM (vacuum assisted resin transfer moulding) is one method, which is typically employed for manufacturing composite structures, such as wind turbine blades comprising a fibre-reinforced matrix material. During the manufacturing process, liquid polymer, also called resin, is filled into a mould cavity, in which fibre material priorly has been arranged, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibres arranged in mats, felt mats made of individual fibres or unidirectional or woven mats, i.e. multi-directional mats made of fibre rovings, etc. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the first mould part and the vacuum bag, the liquid polymer can be drawn in and fill the mould cavity with the fibre material contained herein. So-called distribution layers and/or distribution tubes, also called inlet channels, are typically used between the vacuum bag and the fibre material in order to obtain as sound and efficient a distribution of polymer as possible. In most cases the polymer applied is polyester, epoxy or vinylester, and the fibre-reinforcement is most often based on glass fibres or carbon fibres.

During the process of filling the mould, a vacuum, i.e. an under pressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

RTM is less frequently used for or in the manufacture of wind turbine blades than VARTM.

Prepreg moulding is a method in which reinforcement fibres are pre-impregnated with a pre-catalysed resin. The resin is typically solid or near-solid at room temperature. The prepregs are arranged on a mould surface, vacuum bagged and then heated to a temperature, where the resin is allowed to reflow and eventually cured. This method has the main advantage that the resin content in the fibre material is accurately set beforehand. Prepreg moulding may be used in connection with both a RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

Blades for wind turbines have increased in size in the course of time and may now be more than 60 meters long and weigh more than 18 tonnes. As a result, the impregnation time in connection with manufacturing such blades has increased, as more fibre material has to be impregnated with polymer. Furthermore, the infusion process has become more complicated, as the impregnation of large shell members, such as blades, requires control of the flow fronts to avoid dry spots.

In order to reduce the weight of wind turbine blades carbon fibres have been used increasingly, as they have a greater strength and rigidity than glass fibres.

Carbon fibres have a considerably smaller diameter than inter alia glass fibres. Consequently, they are compacted to form a very dense structure when subjected to vacuum as in VARTM and also in prepreg moulding. Especially in VARTM, the very dense structure with a very limited amount of voids limits or prevents the propagation and impregnation of the carbon fibres with resin so that dry spots are difficult or impossible to avoid.

WO 2010/018225 discloses a wind turbine blade comprising metal fibres, such as steel fibres. In one embodiment, the wind turbine blade comprises outer layers or skins of glass fibres or carbon fibres in order to obtain a smooth surface.

DISCLOSURE OF THE INVENTION

It is an object of the present invention to obtain a new blade and new method of manufacturing such a blade or a part thereof, such as shell half thereof, which overcomes or ameliorates at least one of the disadvantages of the prior art or which provides a useful alternative.

According to a first aspect of the invention, this is obtained by a blade as stated in the preamble of claim 1 and wherein at least a portion of the shell structure is formed of laminate comprising at least one metal filament layer comprising metal filaments and being sandwiched between two carbon fibre layers comprising carbon fibres only, the carbon fibre layers being contiguous with the metal filament layer.

The wind turbine blade may comprise individual shell parts adhered to each other such as a first shell half defining a suction side of the wind turbine blade and a second shell half defining a pressure side of the wind turbine blade, the two shell halves being glued together along a trailing and a leading edge of the blade. Alternatively, the wind turbine blade may be formed as a single shell structure.

According to a second aspect of the invention, the above object is obtained by a method of manufacturing a shell structure part of a wind turbine blade, the shell structure part being made of a fibre-reinforced polymer material including a polymer matrix and a fibre-reinforcement material comprising a plurality of carbon fibre layers embedded in the polymer matrix, the method comprising the steps of:

A providing a first mould part having a longitudinal direction and comprising a first forming surface with a contour defining at least a portion of an outer surface of the shell structure part;

B arranging the fibre-reinforcement material in the first mould part so that at least in a longitudinal portion thereof at least one metal filament layer comprising metal filaments is sandwiched between carbon fibre layers comprising only carbon fibres, the carbon fibre layers being contiguous with the metal filament layer;

C providing a second mould part and sealing the second mould part to the first mould part so as to provide a mould cavity between the first and the second mould part;

D preferably evacuating the mould cavity;

E providing resin in the mould cavity simultaneously with step B, and/or subsequently to step C; and F curing or allowing the resin to cure in order to form the shell structure part.

By arranging at least one metal filament layer comprising metal filaments between two carbon fibre layers comprising only carbon fibres and wherein the carbon fibre layers are contiguous with the metal filament layers, the metal filament layer functions as a distribution layer improving the propagation of the resin to the carbon fibre layers in the longitudinal direction, transversely in the plane of the carbon fibres and in a direction transversely through the carbon fibre layers. Thereby, also an improved flow front is obtained for avoiding dry spots. Normally, distribution layers which provide less resistance to resin flow than the reinforcing fibrous material are provided as separate layers and do not contribute to the strength of the composite material. However, the metal filament layer arranged between two carbon fibre layers functions as a distribution layer and contributes to the strength of the wind turbine blade. Therefore, it is seen that the metal filaments also constitutes a reinforcement layer in the shell structure. Further, carbon fibres are available having stiffness, i.e. E-modulus, close to that of steel fibres having an E-modulus of about 210 GPa. Thereby layers having differing stiffness can be avoided.

According to a further aspect of the invention the object is obtained by the use of a metal filament layer, such as a steel filament layer as an infusion-enhancing resin distribution layer in a laminate of a wind turbine blade comprising a plurality of carbon fibre layers, the metal filament layer preferably being sandwiched between two carbon fibre layers comprising carbon fibres only, the carbon fibre layers being contiguous with the metal layer By the phrase "carbon fibres only" is to be understood that at least 85%, 90%, 95% or 98% of the fibres are carbon fibres. It may even mean that 100% of the fibres are carbon fibres.

According to an embodiment the carbon fibres constitute at least 70%, 75%, 80%, 85%, or 90% by volume of the reinforcement material of the laminate.

According to another embodiment the laminate comprises a plurality of carbon fibres layers arranged on top of each other at least on one side of the metal filament layer.

According to a further embodiment the laminate comprises a plurality of carbon fibres layers arranged on top of each other both on the first side of the metal filament layer and on an opposite second side of the metal filament layer.

Tests have shown that a faster and more though-out impregnation of the metal filament layers is obtained in the longitudinal direction, in the transverse direction of the plane of the layers and in the transverse direction through the layers, even when more carbon fibre layers are arranged contiguous with the first side of the metal filament layer and with both the first and second side of the metal filament layer.

According to an embodiment of the invention the laminate comprises two or more mutually interspaced metal filament layers. It is thereby possible to obtain a through-out impregnation without dry spots of a laminate comprising a large quantity of carbon fibre layers, as each metal filament layer will be able to impregnate adjacent carbon fibre layers.

According to a further embodiment, the at least one metal filament layer comprises metal filaments only.

According to another embodiment the at least one metal filament layer comprises both metal filament and non-metal fibres.

According to an advantageous embodiment the metal filament layer comprises at least one metal filament mat. When the metal filaments in the metal filament layer are arranged in a mat, it is very convenient to arrange the metal filament layer in a mould used for forming the wind turbine blade or a part thereof.

It should be noted that in the metal filament layer one or more metal filaments mats may comprise metal filaments only and/or one of more metal filament mats may comprise both metal filaments and non-metal fibres, i.e. be so-called hybrid mats.

The hybrid mat may comprise at least 50%, 60%, 70%, 80% or 90% by volume of metal filaments.

The non-metal fibres of the hybrid mat are preferably carbon and/or glass fibres.

The metal filaments are preferably steel filaments.

1-19%, 3-19% or 5-19% by volume of the fibre-reinforcement material of the laminate may be metal filaments. The rest of the fibres are preferably carbon fibres only.

The metal filaments have a cross-sectional dimension substantially greater than that of the non-metal fibres.

The metal filaments may have a cross-sectional dimension in the range between 0.04 mm and 1 mm or in the range between 0.07 mm and 0.75 mm or in the range between 0.1 mm and 0.5 mm.

According to a preferred embodiment metal filaments of the metal filament mats are arranged in bundles, preferably comprising at least three filaments, such as at least 7, 12, 24 or 36 filaments. By using bundles of filaments the drapability of the mats is improved compared to mats being formed of monofilaments having the same diameter as a bundle of filaments.

According to a further embodiment, the bundles of metal filaments are arranged mutually interspaced in the mat. The bundles of metal filaments may be connected and mutually interspaced by means of weft yarns extending perpendicular to the longitudinal direction of the metal filaments.

It should be noted that it is also possible to use monofilaments in the mats and to connect these by means of weft yarns preferably extending perpendicular to the longitudinal direction of the metal filaments. The metal filaments may be substantially unidirectional, advantageously arranged substantially in the longitudinal direction of the blade so as to increase the bending stiffness of the blade.

According to another embodiment at least 50%, 60%, 70%, 80%, 90% or 100% of the metal filaments are arranged substantially parallel to each other.

According to an additional embodiment the portion of shell structure formed of the laminate is a longitudinally extending reinforcement section comprising a plurality of non-metal fibre layers.

Preferably, the longitudinally extending reinforcement section extends over at least 40, 50, 60, 70 or 75% of the length of the wind turbine blade.

The above longitudinally extending reinforcement section forms a load-bearing structure of the blade and is also called a main laminate.

In another embodiment 50, 60, 70, 80, 90 or 100% of the metal filaments of the laminate are arranged substantially in the longitudinal direction of the blade. This means that the metal filaments themselves may be arranged substantially in the longitudinal direction of the blade. This may also encompass filament cores comprising individual filaments that are mutually twisted. The pitch length of the twist should be comparably high, e.g. higher than 5, 10, 15, or 20 times the diameter of the individual filaments.

However, it is preferred that that the individual filaments are non-twisted as this yields a better compression strength and also a better wetting of the carbon fibres.

The metal filaments may have a rough surface, e.g. provided by sandblasting or glass blasting of the surface of the metal filaments, to thereby provide strong adherence between the metal filaments and the resin.

Alternatively or additionally a size may be applied to the metal filaments so that the metal filaments have an affinity to a certain resin.

In a preferred embodiment of the method according to the invention, the second mould part is a so-called vacuum bag.

According to an embodiment of the method of manufacturing a shell structure, the at least one metal filament layer comprises only metal filaments, the metal filament preferably being arranged in a metal filament mat.

The at least one metal filament layer may, however, also comprise at least one hybrid mat comprising both metal filaments and non-metal fibres, preferably carbon fibres and/or glass fibres.

According to a further embodiment of the method according to the invention, 50%, 60%, 70%, 80%, 90% or 100% of the metal filaments are arranged parallel to each other and extend in the longitudinal direction of the first mould part.

BRIEF DESCRIPTION OF THE DRAWINGS

The invention is explained in detail below with reference to the drawing(s), in which FIG. 1 shows a schematic cross section of an embodiment of a mould part with fibre material arranged in the mould part and thereby in principle also discloses a cross-sectional view of a shell half of a wind turbine blade, said shell half defining the pressure side of the blade and is to be glued to a second shell half defining the suction side of the blade along the trailing and leading edge of the blade;

FIG. 2 is a cross-sectional view of a reinforcement section in the wind turbine blade;

FIG. 3 shows a unidirectional metal filament mat;

FIG. 4 shows a hybrid mat comprising both metal filaments and non-metal fibres;

FIG. 5 is a cross-sectional view of a unidirectional metal filament mat comprising monofilaments mutually interspaced by means of weft yarns;

FIG. 6 is a cross-sectional view of a unidirectional mat of monofilaments arranged in bundles, the bundles being formed of monofilaments arranged in a plane and being mutually interspaced by means of weft yarns.

DETAILED DESCRIPTION OF THE INVENTION

Figure 7:
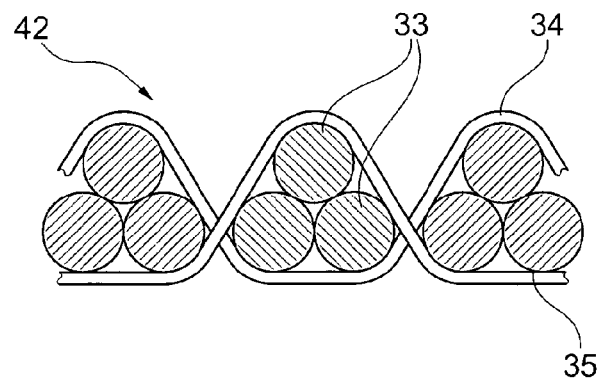
FIG. 7 is a cross-sectional view of a unidirectional mat formed of densely packed monofilaments arranged in bundles, each bundle comprising three monofilaments and being mutually interspaced by means of weft yarns.

FIG. 1 is a cross-sectional view through an embodiment of a first mould part 1 for use in VARTM process. The first mould part 1 is a rigid mould part and has an upwardly facing forming surface 2. A second mould part 3 being a so-called vacuum bag is sealed to the first mould part 1, whereby a mould cavity is formed between the first mould part 1 and the vacuum bag 3. A number of fibre layers, core parts and reinforcement sections are placed in the mould cavity, said parts being included in a finished wind turbine blade shell part, in the present example the shell half defining the pressure side of the blade.

The blade shell part comprises one or more lower fibre layers 4 impregnated with resin and optionally coated with gelcoat defining the exterior surface of the shell part, and one or more upper fibre layers 5 impregnated with resin and defining the interior surface of the shell part. The upper and lower fibre layers 5, 4 may be formed of mats comprising any fibre materials, such as glass fibres, carbon fibres and/or metal filaments or a combination thereof. Between the lower and upper fibre layers 4, 5, a longitudinally extending reinforcement section, also called a main laminate 6, is arranged. The reinforcement section 6 comprises a plurality of fibre layers impregnated with resin.

Arranged between the lower and upper fibre layers 4, 5 are additionally a first core part 7 and a second core part 8 as well as a trailing edge fibre-reinforcement 9 at the trailing edge 10 of the shell part and a leading edge fibre-reinforcement 11 at the leading edge 12 of the shell part.

Longitudinally extending inlet channels 13—also called distribution channels—are arranged on top of the upper fibre layers 5 and below the vacuum bag 3. Resin is supplied to the mould cavity through the inlet channels 13. Vacuum outlets 14 are provided at a first rim and a second rim of the first mould 1, viz. at the leading edge 12 and the trailing edge 10 of the wind turbine shell part. The mould cavity is evacuated through these vacuum outlets 14.

As shown in FIG. 2, the main laminate 6 comprises the following layers: one or two centrally arranged metal filament layers 15 sandwiched between two first intermediate carbon fibre layers 16 only comprising carbon fibres and being contiguous with the respective centrally arranged metal filament layer 15; and two second intermediate carbon fibre layers 17 only comprising carbon fibres and contiguous with the respective first intermediate carbon fibre layer 16.

The main laminate 6 further comprises first intermediate metal filament layers 18 being contiguous with the respective second intermediate carbon fibre layer 17, and outer carbon fibre layers 19 being contiguous with the respective first intermediate metal filament layer 18.

As can be seen, the main laminate 6 may comprise two or more metal filament layers 15, 18 for flow enhancement during the infusion process. However, it should be noted that the figure is for illustrative purposes only and is drawn out of scale, since the metal filament layers typically will be sandwiched between a plurality of carbon fibre layers.

As an example, the main laminate may be constructed with carbon fibre layer sections with e.g. twenty carbon fibre layers and intermediate metal filament layers for the flow enhancement, i.e. as an example twenty carbon fibre layers, one metal filament layer, twenty carbon fibre layers, one metal filament layer and finally twenty carbon fibre layers.

The wind turbine shell half is manufactured as follows:

The lower fibre layers 4 are arranged on the upwardly facing forming surface 2 of the first rigid mould part 1. Then the layers of the main laminate 6, the core parts 7 and 8 and the trailing edge fibre-reinforcement 10 and the leading edge fibre-reinforcement 11 are arranged on top of the lower fibre layers 4. The upper fibre layers 5 are then arranged and on top thereof the longitudinally extending inlet channels 13. Finally, the vacuum outlets 14 arranged and the vacuum bag 3 is sealed to the first rigid mould part 1 to form the mould cavity. The mould cavity is then evacuated through vacuum outlets 14 and resin is supplied to the mould cavity through inlet channels 13.

Resin is subsequently supplied to the inlet channels 13 so as to provide a resin flow front gradually moving towards the vacuum outlets 14 in the transverse direction of the mould. The central metal filament layers 15 sandwiched between the first intermediate carbon fibre layers 16, 16 and the first intermediate metal filament layers 18 sandwiched between the outer carbon fibre layer 19 and the second intermediate carbon fibre layer 17 function as distribution layers. As a result, the metal filament layers allow for distribution of resin to the adjacent carbon fibre layers so that these layers are impregnated with resin without dry spots being formed. In addition, the metal filaments function as a reinforcement layer in the blade shell increasing the stiffness of the blade. The metal filaments may advantageously be arranged substantially unidirectional in the longitudinal direction of the blade shell.

After resin impregnation of all of the fibre layers, the resin is allowed to cure, whereafter the moulded shell half is removed from the mould.

The metal filaments of the metal filament layers are preferably steel fibres and preferably arranged in metal filament mats. The metal filament mats may be unidirectional mats comprising primarily filaments extending in the longitudinal direction or multidirectional mats. Further they may be mats comprising only metal filaments or be so-called hybrid mats comprising both metal filaments and non-metal fibres such as carbon fibres.

FIG. 3 shows a portion of a metal filament mat being a unidirectional mat comprising a number of mutually parallel metal filaments. The metal filaments 20 are mutually interspaced by means of weft yarns 21, 22 extending transversely of the longitudinal direction of the metal filaments 20. The metal filaments 20 shown in FIG. 3 may be monofilaments or bundles of filaments as explained below.

FIG. 4 shows a portion of hybrid mat 23 comprising steel filaments 24 and non-metal fibres 25, such as carbon fibres which woven together. In FIG. 4 the non-metal fibres 25 may be multi-strand carbon fibres, where the individual fibres have a diameter being substantially smaller than that of the steel filaments. The steel filaments 24 may be monofilaments or bundles of filaments, as explained below.

Both the unidirectional mat 26 shown in FIG. 3 and the hybrid mat 23 shown in FIG. 4 may be used as metal filament mats in the main laminate 6 shown in FIGS. 1 and 2.

FIG. 5 is a sectional view of a part of a metal filament mat 41 comprising mutually parallel and mutually interspaced monofilaments 30 of metal, the monofilament being interspaced by means of the weft yarns 31, 32.

FIG. 6 is a sectional view of part of a metal filament mat 26 comprising bundles of metal filaments 27 and wherein the bundles comprise five metal filaments 27 arranged in a common plane, and wherein the bundles of metal filaments 27 are separated by means of crossing weft yarns 28, 29.

FIG. 7 is a sectional view of a portion of a metal filament mat 42 comprising bundles of three metal filaments 33, the bundles being interspaced by means of weft yarns 34, 35.

Figure 8:
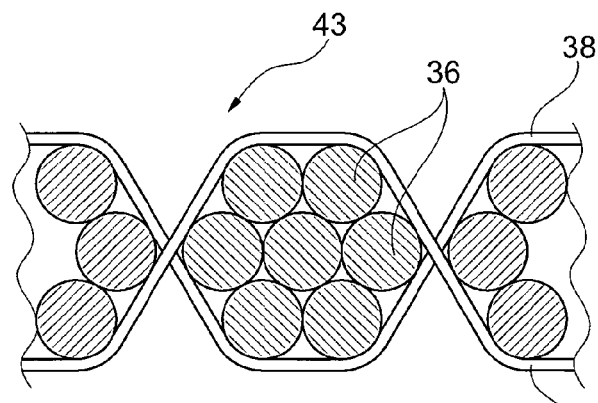
FIG. 8 is a cross-sectional view of a unidirectional mat comprising monofilaments densely packed in a bundle comprising seven monofilaments, the bundles being mutually interspaced by means of weft yarns.

FIG. 8 is a sectional view of a portion of a metal filament mat 43 comprising bundles of seven metal filaments 36 being closely packed and wherein the bundles of metal filaments 36 are mutually interspaced by means of weft yarns 37, 38.

The filaments of the bundles may be twisted in the longitudinal direction with a relatively high pitch length. However, it is preferred that that the individual filaments are non-twisted as this yields a better compression strength and also a better wetting of the carbon fibres.

Figure 9:
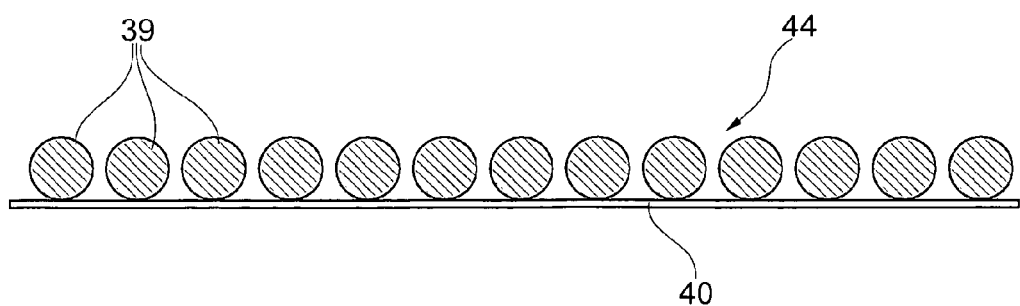
FIG. 9 shows a mat of monofilaments arranged mutually parallel and mutually interspaced and being arranged on a scrim.

FIG. 9 is a sectional view of a portion of a metal filament mat 44 comprising mutually parallel and interspaced monofilaments 39 arranged in a common plane. The monofilaments 39 are arranged on a backing sheet or scrim 40 having an open structure, such as a weakened or knitted structure allowing easy passage of resin through said scrim.

The invention has been described with reference to advantageous embodiments. However, the scope of the invention is not limited to the illustrated embodiment, and alterations and modifications may be carried out without deviating from the scope of the invention.

LIST OF REFERENCE NUMERALS

1 First rigid mould part
2 Upwardly facing forming surface
3 Second mould part (vacuum bag)
4 Lower fibre layers
5 Upper fibre layers
6 Reinforcement section (main laminate)
7 First core part
8 Second core part
9 Trailing edge fibre-reinforcement
10 Trailing edge of the shell part
11 Leading edge fibre-reinforcement
12 Leading edge of the shell part
13 Inlet channels
14 Vacuum outlets
15 Centrally arranged metal filament layer
16 First intermediate carbon fibre layer
17 Second intermediate carbon fibre layer
18 First Intermediate metal filament layer
19 Outer carbon fibre layers
20 Metal filaments
21, 22 Weft yarns
23 Hybrid mat
24 Steel filaments 25 Non-metal fibres
26 Metal filament mat
27 Metal filaments
28, 29 Weft yarns
30 Monofilaments
31, 32 Weft yarns
33 Metal filaments
34, 35 Weft yarns
36 Metal filaments
37, 38 Weft yarns
39 Monofilaments
40 Scrim
41 Metal filament mat
42 Metal filament mat
43 Metal filament mat
44 Metal filament mat

The invention claimed is:

1. A wind turbine blade having a longitudinal direction and including a shell structure made of a fibre-reinforced polymer material including a polymer matrix and reinforcement material comprising a plurality of carbon fibre layers embedded in the polymer matrix characterised in that at least a portion of the shell structure is formed of a laminate comprising:
   at least one metal filament layer comprising metal filaments, a first side, and a second opposite side; and
   a plurality of carbon fibre layers, each carbon fibre layer comprising carbon fibres only and the carbon fibre layers being arranged on top of each other,
   wherein the carbon fibre layers abutting the metal filament layer are positioned on the first side of the metal filament layer and on the opposite second side of the metal filament layer.

2. The blade according to claim 1, wherein the metal filament layer is a reinforcement layer.

3. The blade according to claim 1, wherein the metal filaments are arranged substantially unidirectional.

4. The blade according to claim 1, wherein the metal filaments are arranged substantially in the longitudinal direction of the wind turbine blade.

5. The blade according to claim 1, wherein the carbon fibres constitute at least 70%, 75%, 80%, 85%, or 90% by volume of the reinforcement material of the laminate.

6. The blade according to claim 1, wherein the laminate comprises two or more mutually interspaced metal filament layers.

7. The blade according to claim 1, wherein the at least one metal filament layer comprises metal filaments only.

8. The blade according to claim 1, wherein the at least one metal filament layer comprises both metal filaments and non-metal fibres.

9. The blade according to claim 1, wherein the metal filament layer comprises at least one metal filament mat.

10. The blade according to claim 9, wherein the metal filaments of the metal filament mat are arranged in bundles.

11. The blade according to claim 10, wherein the metal filaments of the metal filament mat are arranged in bundles, comprising at least three filaments.

12. The blade according to claim 11, wherein the metal filaments of the metal filament mat are arranged in bundles, comprising at least 7, 12, 24 or 36 filaments.

13. The blade according to claim 1, wherein at least 50%, 60%, 70%, 80%, 90% or 100% of the metal filaments are arranged substantially parallel to each other.

14. The blade according to claim 1, wherein the portion of the shell structure formed by the laminate is a longitudinally extending reinforcement section comprising a plurality of non-metal fibre layers.

15. The blade according to claim 1, wherein 50%, 60%, 70%, 80%, 90% or 100% of the metal filaments of the laminate are arranged substantially in the longitudinal direction of the blade.

16. A method of manufacturing a shell structure part of a wind turbine blade, the shell structure part being made of a fibre-reinforced polymer material including a polymer matrix and a fibre-reinforcement material comprising a plurality of carbon fibre layer embedded in the polymer matrix, the method comprising the steps of:
   A providing a first mould part having a longitudinal direction and comprising a first forming surface with a contour defining at least a portion of an outer surface of the shell structure part;
   B arranging the fibre-reinforcement material in the first mould part so that at least in a longitudinal portion thereof at least one metal filament layer comprising metal filaments is sandwiched between carbon fibre layers comprising only carbon fibres, the carbon fibre layers abutting the metal filament layer;
   C providing a second mould part and sealing the second mould part to the first mould part so as to provide a mould cavity between the first and the second mould part;
   D providing resin in the mould cavity simultaneously with step B, and/or subsequently to step C; and
   E curing or allowing the resin to cure in order to form the shell structure part.

17. The method according to claim 16, wherein the at least one metal filament layer comprises only metal filaments, the metal filament preferably being arranged in a metal filament mat.

18. The method of claim 16, further comprising evacuating the mould cavity after step C and before step D.

* * * * *